United States Patent [19]
Merchant et al.

[11] Patent Number: 6,112,294
[45] Date of Patent: Aug. 29, 2000

[54] CONCURRENT EXECUTION OF MULTIPLE INSTRUCTIONS IN CYCLIC COUNTER BASED LOGIC COMPONENT OPERATION STAGES

[75] Inventors: Shashank C. Merchant, Sunnyvale; Thomas Jefferson Runaldue, San Jose, both of Calif.

[73] Assignee: Advanced Micro Devices, Inc., Sunnyvale, Calif.

[21] Appl. No.: 09/112,146

[22] Filed: Jul. 9, 1998

[51] Int. Cl.[7] .................................................. G06F 9/38
[52] U.S. Cl. ........................... 712/219; 712/220; 713/502
[58] Field of Search .................................... 712/219, 221, 712/220; 713/502

[56] References Cited

U.S. PATENT DOCUMENTS

| | | | |
|---|---|---|---|
| 4,792,892 | 12/1988 | Mary et al. | 712/241 |
| 5,469,552 | 11/1995 | Suzuki et al. | 712/244 |
| 5,471,626 | 11/1995 | Carnevale et al. | 712/219 |
| 5,564,029 | 10/1996 | Ueda et al. | 712/216 |
| 5,835,968 | 11/1998 | Mahalingaiah et al. | 711/214 |
| 5,958,045 | 9/1999 | Pickett | 712/229 |

*Primary Examiner*—Kenneth S. Kim

[57] ABSTRACT

An arrangement in a processor circuit for concurrently executing a plurality of instructions. An instruction control unit concurrently supplies a plurality of instruction addresses to an instruction memory. Each clock cycle, the instruction memory receives one instruction address from the instruction control unit based on a count value and selectively fetches and outputs corresponding to the received instruction address. An instruction decoder decodes, each clock cycle, the instruction output from the instruction memory the preceding clock cycle while identifying a memory address and an instruction operation for each fetched instruction. A memory interface, based on the count value, selectively supplies to an external memory, each clock cycle, one of the supplied memory addresses and identified by the instruction decoder for the respective fetched instructions. A logic unit, based on the count value also, selectively executes, each clock cycle, the instruction operation for the corresponding fetched instruction using memory data retrieved from the supplied memory address. The instruction control unit has program counter circuits that respectively output the instruction addresses. An instruction controller generates program instruction control signals for each of the program counter circuits in response to a corresponding instruction sequence.

7 Claims, 9 Drawing Sheets

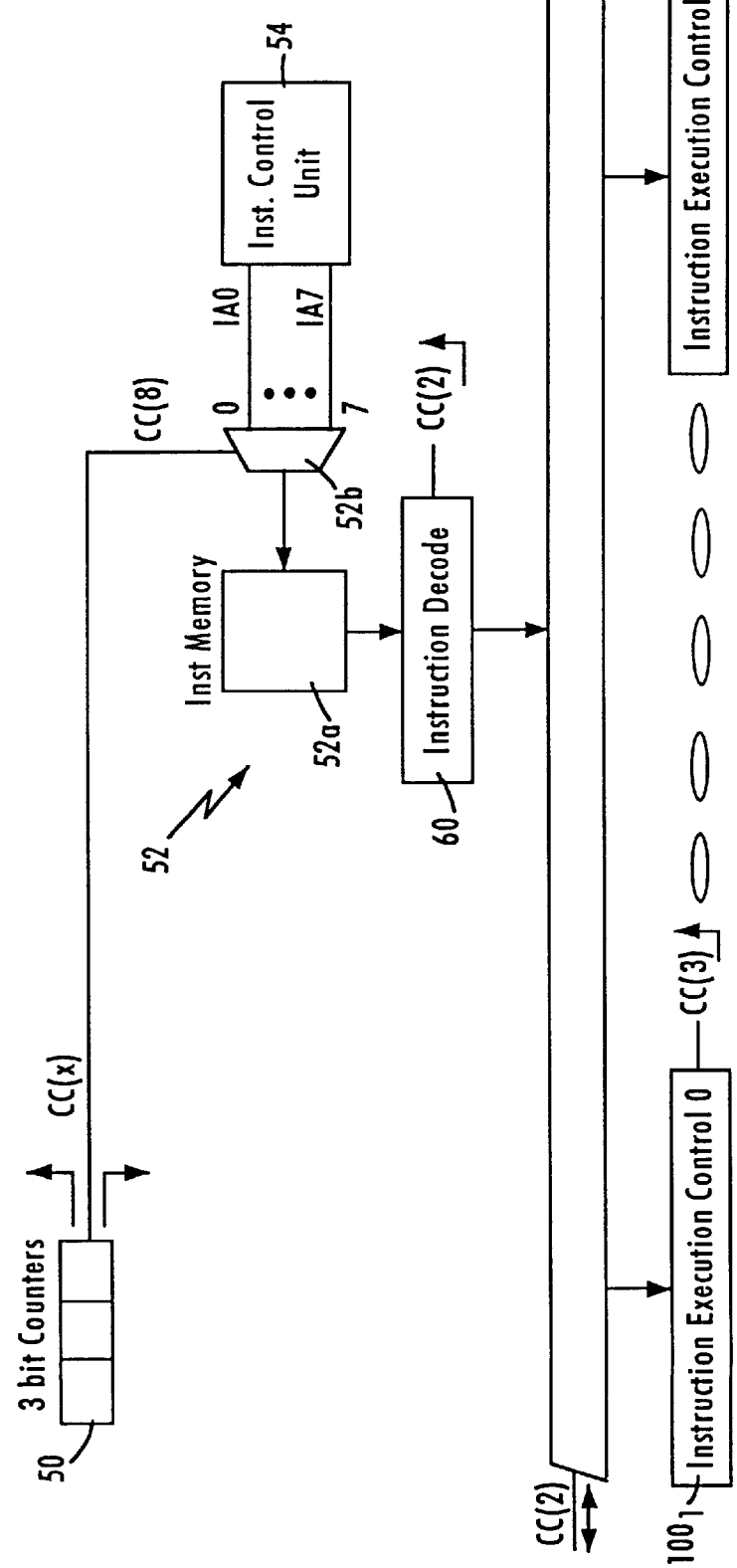

FIG. 4A

IPv4 Ethernet Frame

| Byte 7 | Byte 6 | Byte 5 | Byte 4 | Byte 3 | Byte 2 | Byte 1 | Byte 0 |
|---|---|---|---|---|---|---|---|
| Frame Pointer | | | | | | | Rx Port |
| | | | MAC DA | | | MAC SA | |
| | | MAC SA | | | VLAN Type | VLAN ID | |
| Protocol Type | Ver | IHL | TOS | Total Length | | Identifier | |
| Flags | Offset | TTL | Protocol | Header Checksum | | IP DA | |
| IP DA | | | | | | | |

FIG. 4B

Non-IP Ethernet Frame

| Byte 7 | Byte 6 | Byte 5 | Byte 4 | Byte 3 | Byte 2 | Byte 1 | Byte 0 |
|---|---|---|---|---|---|---|---|
| Frame Pointer | | | | | | | Rx Port |
| | | | MAC DA | | | MAC SA | |
| | | MAC SA | | | VLAN Type | VLAN ID | |
| Protocol Type | | | | | | | |

FIG. 4C

Non-IP 802.3 Frame

| Byte 7 | Byte 6 | Byte 5 | Byte 4 | Byte 3 | Byte 2 | Byte 1 | Byte 0 |
|---|---|---|---|---|---|---|---|
| Frame Pointer | | | | | | | |
| | | | MAC DA | | | | |
| | | MAC SA | | | | | |
| Length | | SSAP | DSAP | VLAN Type | | VLAN ID | |
| Protocol Type | | | | Control | | Org. code | |

FIG. 4D

IPv4 802.3 Frame

| Byte 7 | Byte 6 | Byte 5 | Byte 4 | Byte 3 | Byte 2 | Byte 1 | Byte 0 |
|---|---|---|---|---|---|---|---|
| Frame Pointer | | | | | | | Rx Port |
| | | | MAC DA | | | | |
| | | MAC SA | | | | | |
| Length | | SSAP | DSAP | VLAN Type | | VLAN ID | |
| Protocol Type | | Var | IHL | Control | Total Length | Org. code | |
| Flags | Offset | TTL | Protocol | Header Checksum | | Identifier | |
| IP DA | | | | IP SA | | | IP DA |

IPv6 Ethernet Frame

| Byte 7 | Byte 6 | Byte 5 | Byte 4 | Byte 3 | Byte 2 | Byte 1 | Byte 0 |
|---|---|---|---|---|---|---|---|
| Frame Pointer | | | | | | | Rx Port |
| | | MAC DA | | | | MAC SA | |
| | | MAC SA | | | VLAN Type | VLAN ID | |
| Protocol Type | | Var | IHL | | | Payload Length | |
| Next Header | Hop Limit | | | Flow Label | | | |
| | | | | IP DA | | | |
| | | | IP DA | | | IP SA | |
| | | | IP SA | | | | |
| | | | IP DA | | | | |

| IPv6 Ethernet Frame | | | | | | | |
|---|---|---|---|---|---|---|---|
| Byte 7 | Byte 6 | Byte 5 | Byte 4 | Byte 3 | Byte 2 | Byte 1 | Byte 0 |
| Frame Pointer | | | | | | | Rx Port |
| MAC DA | | | | | | | |
| MAC SA | | | | | MAC SA | | |
| Length | | SSAP | DSAP | Control | Org. code | | |
| Protocol Type | | Var | IHL | VLAN Type | | VLAN ID | |
| Next Header | Hop Limit | | | Flow Label | | Payload Length | |
| IP DA | | | | | | | |
| IP DA | | | | IP SA | | | |
| IP SA | | | | IP DA | | | |
| IP DA | | | | | | | |

FIG. 5B

Register Organization for IPv6

| | Byte 7 | Byte 6 | Byte 5 | Byte 4 | Byte 3 | Byte 2 | Byte 1 | Byte 0 | |
|---|---|---|---|---|---|---|---|---|---|
| | Frame Pointer | | | | | | Rx Port | Parse_0 |
| | Status | | | | | | | | Parse_1 |
| | | | | MAC DA | | | | | Parse_2 |
| | | | MAC SA | | | | | | Parse_3 |
| | | | | | VLAN ID | | VLAN Type | | Parse_4 |
| | SSAP | DSAP | Control | Org. code | | | 802.3 Length Field | | Parse_5 |
| | Ver | Flow Label | | Length | Need Header | | Protocol Type | Hop Limit | Parse_6 |
| | | | | | IP DA | | | | Parse_7 |
| | | | | | IP DA | | | | Parse_8 |
| | | | | | IP SA | | | | Parse_9 |
| | | | | | IP SA | | | | Parse_10 |
| | | | | | | | | | Parse_11 |

62'

CONCURRENT EXECUTION OF MULTIPLE INSTRUCTIONS IN CYCLIC COUNTER BASED LOGIC COMPONENT OPERATION STAGES

BACKGROUND OF THE INVENTION

1. Technical Field

The present invention relates to processors configured for performing multiple operations simultaneously, more specifically to a processing architecture that minimizes processing latency by performing multiple concurrent operations, for example network address comparison in a network workgroup switch.

2. Background Art

Switched networks, such as local area networks or wide area networks, use a network switch, also referred to as a workgroup switch, for supplying data frames between network nodes via a media. Conventional switched local area network architectures use a media access control (MAC) enabling a network interface device within each network node (e.g., workstation, switch) to access the media.

The network switch is configured for switching data frames received from a transmitting node to a destination node based on the header information in the received data frame at the MAC layer, including source address and destination address. For example, the Ethernet (IEEE 802.3) protocol specifies a header, following a 64-bit preamble and start frame delimiter, having a 6-byte destination address followed by a 6-byte source address. One possible arrangement for generating a frame forwarding decision uses the destination address in a direct addressing scheme, where the network switch accesses a table storing switching data for a plurality of network addresses. For example, the switching data for a given destination address may be stored at a memory location having a table address corresponding to the destination address. Such a direct addressing arrangement, however, is not practical because the resulting memory address space is prohibitively large.

In particular, a workgroup switch having several high speed ports, for example 100 Mb/s or 1 Gb/s ports, requires frame forwarding decisions to be performed in a relatively short period of time to support wire-rate traffic, where the data packets are switched according to the data rate of the network media. For example, a network switch having twelve (12) 100 Mb/s ports and one Gb/s port requires a frame forwarding and/or filtering decision to be executed approximately within 300 nanoseconds. Since any memory access requires two clock cycles (one for addressing the memory, one for reading data from the addressed location), it becomes extremely difficult for the network switch to make frame forwarding decisions at the wire rate.

Conventional approaches to optimizing processing speed include implementing hardwired logic to execute logic operations. Hardwired logic has the advantage of executing logic operations faster than instruction-based processors. However, the hardwired logic cannot be modified or updated, absent a complete replacement of the silicon-based logic. Hence, instruction-based processing has the advantage of flexibility at the expense of processing speed.

Although conventional network switches use MAC-based switching protocols, referred to as layer-2 protocols, efforts are underway to develop layer-3 switching protocols, for example Internet protocol (IP) based addressing. Layer-3 switching protocols are still evolving, hence hardwired lookup schemes do not provide the flexibility and programmability currently required to implement layer3 switching in workgroup switches. However, instruction-based processing does not provide sufficient throughput for high-speed workgroup switches that require frame forwarding decisions to be performed on the order of 300 nanoseconds.

DISCLOSURE OF THE INVENTION

There is a need for an arrangement that enables programmable functions to be executed in a more efficient manner that overcomes the speed limitations of conventional microprocessor and instruction-based processing techniques.

There is also a need for an arrangement for executing instruction operations that optimizes execution of multiple instructions with optimum speed and with a minimal amount of hardware circuitry.

There is also a need for an arrangement in a processor circuit of concurrently executing plurality instructions without redundant logic components within the processor circuit.

There is also a need for an arrangement that executes a plurality of instructions requiring access to an external memory in an efficient manner that effectively reduces the overall instruction execution time, notwithstanding delays normally encountered during memory access.

There is also a need for an arrangement in a network switch for determining output switch ports for received data packets in a high speed workgroup switch programmable for selectively performing layer-2 processing and layer-3 processing on a per-packet basis.

There is also a need for a programmable network switch configured for executing high-speed switching operations, while maintaining flexibility for evolving switching protocols.

These and other needs are attained by the present invention, where a processor architecture for use in a network switch concurrently executes a plurality of instructions by successively executing each instruction within a prescribed number of clock cycles. Each instruction requires up to a prescribed number of clock cycles for execution thereof, such that the processor circuit can concurrently execute one of the instruction operations for each of the instructions in respective logic components during each clock cycle.

According to one aspect of the present invention, a method of executing instruction operations comprises successively fetching instructions during a respective prescribed number of cycles, and concurrently executing the fetched instructions by successively executing each of the fetched instructions within the prescribed number of cycles. The successive fetching of instructions provides a staggered sequence of instructions for execution, enabling initiation of execution of each instruction during each cycle without contention of processor resources. Moreover, the successive fetching of instructions enables the fetched instructions to be concurrently executed in a pipelined, timeshared arrangement, where separate logic components perform an instruction operation each cycle for a different instruction. Hence, the advantages of executing multiple instructions may be obtained without the necessity of multiple redundant logical devices for performing the same logical operation, as found in parallel processing architectures.

Another aspect of the present invention provides a method in a processor circuit of concurrently executing a plurality of instructions, comprising establishing a prescribed number of clock cycles for executing an executable instruction in the processor circuit, each executable instruction having a corresponding number of instruction operations up to the prescribed number of clock cycles, and concurrently executing one of the instruction operations for each of the instructions in respective logic components of the processor circuit during each clock cycle. The prescribed number of clock cycles enables the same number of instructions to be concurrently executed within the processor circuit, since each logic component of the processor circuit executes its corresponding instruction operation for a different instruction during each clock cycle. Hence, each logic component executes the same instruction operation for a different instruction during each successive clock cycle, enabling all the logic components to concurrently execute the plurality instructions without redundant logic components. Hence, a processor circuit can concurrently execute a plurality of instructions with minimal circuitry.

Still another aspect of the present invention provides a method in a network switch for determining output switch ports for received data packets, comprising receiving for each of the received data packets a destination address and an addressing protocol identifier, and concurrently determining output switch ports for a prescribed number of data packets, comprising (1) successively fetching an executable instruction each clock cycle for a corresponding data packet based on the corresponding addressing protocol identifier, the executable instruction having a corresponding prescribed number of instruction operations up to the prescribed number, and (2) concurrently executing, during each clock cycle, one of the instruction operations for each of the fetched instructions for the corresponding data packet, at least one of the instruction operations including comparing a stored address to the destination address to determine the output switch port for the corresponding data packet. The addressing protocol identifier specifies an addressing protocol to be used for the corresponding received data packet, enabling enhanced switching functions for data packets having the appropriate addressing protocol. Moreover, the concurrent determination of output switch ports for the data packets by successively fetching an instruction each clock cycle and concurrently executing instruction operations each clock cycle enables multiple instructions related to the output switch port determination to be performed concurrently, without the necessity of multiple redundant logic components. Hence, the network switch is capable of performing switching for different layer protocols with a sufficient throughput for high speed switching, without the necessity of complex logic circuitry.

Still another aspect of the present invention provides a processor apparatus, comprising a counter for outputting a count value, each clock cycle, of a repeating sequence of a prescribed number of clock cycles, an instruction memory for selectively fetching, each clock cycle, one of a plurality of instructions identified by respective instruction addresses supplied during each clock cycle, the instruction memory selecting the corresponding one supplied instruction address based on the count value, an instruction decoder for decoding, each clock cycle, the fetched instruction output from the instruction memory the preceding clock cycle, the instruction decoder configured for identifying a memory address and an instruction operation for each fetched instruction, a memory interface for selectively supplying to an external memory, each clock cycle, one of a plurality of the memory addresses supplied during each clock cycle and identified by the instruction decoder for the respective fetched instructions, the memory interface selecting the corresponding one supplied memory address based on the count value, and a logic unit configured for selectively executing, each clock cycle, one of the instruction operations for the corresponding fetched instruction using memory data retrieved from the supplied memory address, the logic unit selecting the one instruction operation based on the count value. The instruction memory, instruction decoder, memory interface, and logic unit each are configured for performing the corresponding logical operation for a selected instruction each clock cycle based on the count value output by the counter. Hence, the processor apparatus can execute multiple instructions concurrently by effectively staggering the execution sequence of each instruction by a clock cycle. Hence, the processor apparatus is able to effectively reduce processing time for multiple instructions, without the necessity of redundant circuitry that may otherwise increase the cost of the processor.

Yet another aspect of the present invention provides a network switch comprising a plurality of network ports, each configured for sending and receiving data packets selectively according to at least one of a first layer protocol and a second layer protocol, the first layer protocol specifying a first data packet type having a first layer address and a first payload, the second layer protocol specifying a second data packet type having a second layer address and a second payload carrying the first data packet type, switching logic for concurrently determining output network ports for respective received data packets, the switching logic selectively comparing one of the first layer address and the second layer address of each received data packet with a corresponding stored destination address based on identification of one of the first and second layer protocols, and switch fabric for outputting the received data packets to the determined output network ports. The selective determination of an output network port for each received data packet based on the identified protocol enables the switching logic to provide enhanced switching functions for first-layer protocol data packets, while maintaining switching compatibility for second-layer protocol packets. Moreover, the concurrent determinations by the switching logic enables wire-rate switching to be performed in high-speed networks, despite access latencies normally encountered while accessing stored destination addresses.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 3, 3A and 3B are block diagrams illustrating the lookup processor of FIG. 1 according to an embodiment of the present invention.

FIGS. 4A,4B,4C,4D,4E,and 4F are diagrams illustrating data packet structures having different protocols that may be received and processed by the network switch of FIG. 1.

FIGS. 5A and 5B are diagrams illustrating the structures for the register files of FIG. 3 for received data packets having alternative addressing protocols, respectively.

FIG. 6 is a block diagram illustrating the instruction control unit of FIG. 3.

FIG. 7 is a diagram illustrating in detail an instruction execution control unit fetched from the instruction memory of FIG. 3.

BEST MODE FOR CARRYING OUT THE INVENTION

Figure 1:
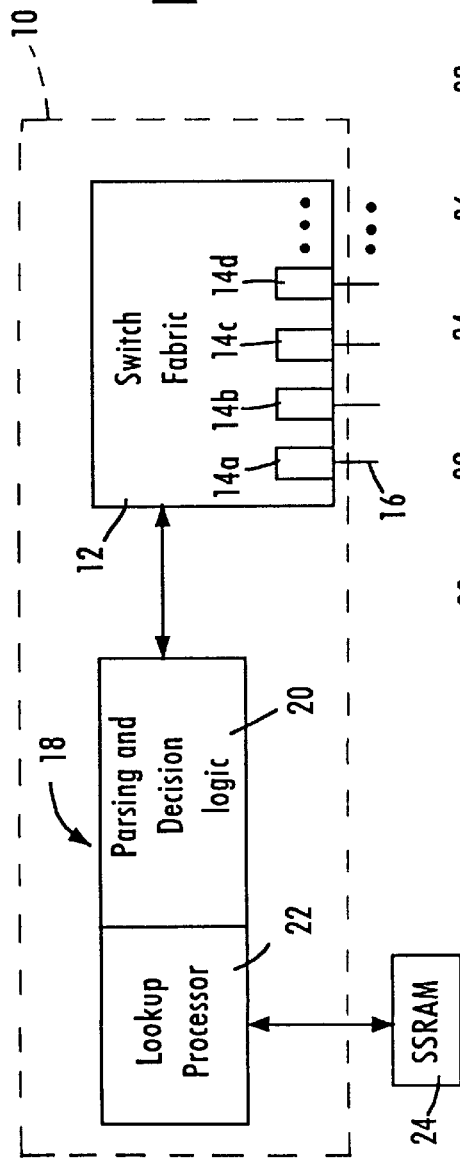
FIG. 1 is a block diagram illustrating a network switch according to an embodiment of the present invention.

FIG. 1 is a block diagram of a network switch configured for sending and receiving data packets on a high speed network (e.g., 100 Mb/s or 1 Gb/s) according to an embodiment of the present invention. As shown in FIG. 1, the network switch 10 includes a switch fabric 12 having a plurality of 100 Mb/s or 1 Gb/s network switch ports 14, each configured for sending and receiving data packets according to a media access control (MAC) layer protocol (e.g., Ethernet, IEEE 802.3), also referred to as a layer-2 protocol, and optionally a network layer protocol, (for example Internet protocol Version 4 (IPv4) or Version 6 (IPv6)), also referred to as a layer-3 protocol. Although FIG. 1 shows only four network switch ports 14a, 14b, 14c, and 14d, any number of switch ports may be used, depending on the throughput of the switch fabric and the switch processing, described below.

The network switch 10 also includes switching logic 18 for determining the network ports 14 that are to output a data packet received by the network switch 10. According to the disclosed embodiment, the switching logic 18 concurrently determines the output network ports for a plurality of received data packets to maintain switching capacity at the wire rate of, for example, 100 Mb/s or 1 Gb/s. As described below, the network switch 10 obtains destination address information for each received data packet from an external memory 24. As will be recognized in the art, address learning is first performed by the network switch to populate the external memory 24 with network addresses, although address leaning may also be performed concurrently with network switching operations once the external memory 24 stores a minimum number of network addresses.

The switching logic 18 includes a parsing and decision logic 20 for identifying the address information for each received packet, and a lookup processor 22 for determining a destination output port 14 for each received data packet based on the corresponding destination information identified by the parsing and decision logic 20. In particular, the parsing and decision logic 20 identifies for each received data packet the corresponding MAC-layer (i.e., layer-2) source address (MAC SA) and MAC-layer destination address (MAC DA). The parsing and decision logic 20 also determines whether the received data packet includes a virtual LAN (VLAN) field according to IEEE 802.1 protocol that provides enhanced addressing capabilities. The parsing and decision logic 20 also identifies the protocol of the MAC-layer addressing, for example whether the MAC-layer addressing is Ethernet-based or IEEE 802.3-based addressing.

Figures 4E, 7:
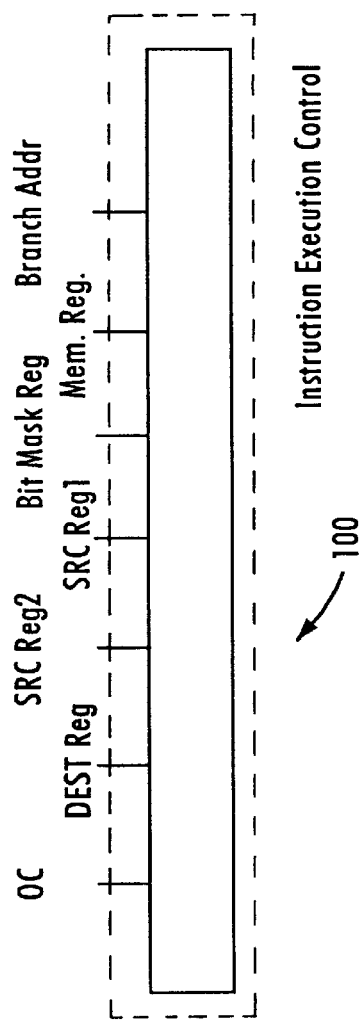
Figures 4F, 6:
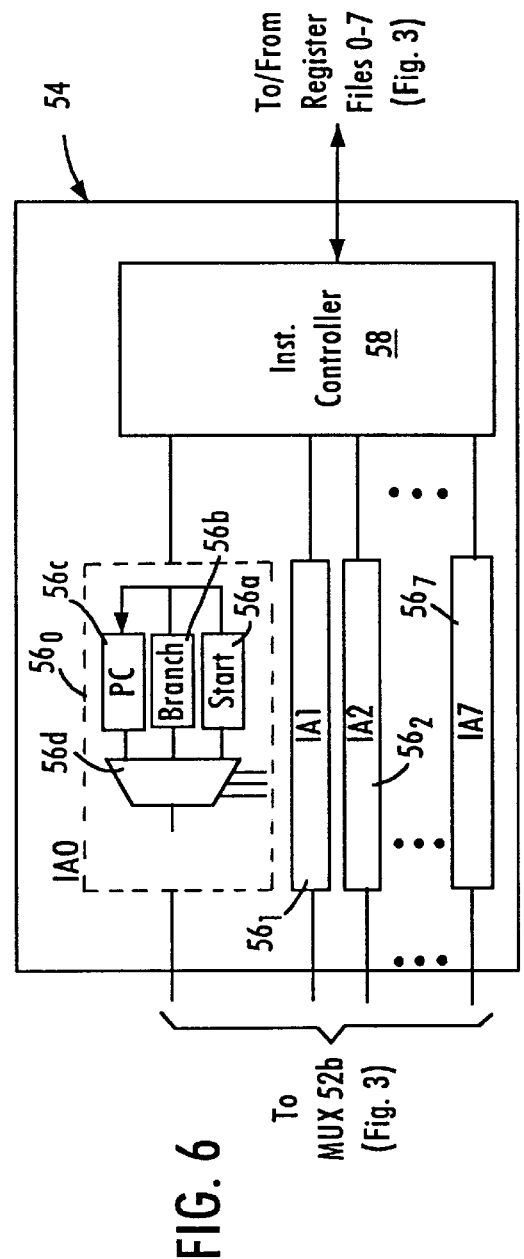

The parsing and decision logic 20 also detects whether a higher layer (layer-3) network-based addressing protocol is present in the received data packet, for example IPv4 or IPv6. Examples of alternative addressing protocols are shown in FIGS. 4A–4F. As shown in FIGS. 4A–4F, the parsing and decision logic 20 can be configured to identify layer-2 Ethernet-based addressing, as shown in FIGS. 4A, 4B, and 4E, as well as addressing using IEEE 802.3 addressing protocol, as shown in FIGS. 4C, 4D, and 4F. In addition, the parsing and decision logic 20 can be configured for identifying network-based (layer-3) addressing, for example IP-based addressing, as shown in FIGS. 4A, 4D, 4E, and 4F.

Determination of layer-3 addressing capabilities requires the parsing and decision logic 20 to interpret the payload of the MAC-layer (layer-2) packet. Hence, the parsing and decision logic 20 first determines the addressing protocol at the MAC layer. The parsing and decision logic 20 then interprets the payload of the MAC-layer packet to identify the presence of layer-3 addressing information. If the parsing and decision logic 20 determines that the MAC-layer frame includes an IP frame, the parsing and decision logic 20 then determines whether the IP frame is an IPv4 or IPv6 protocol frame. Based on the determination of the type of addressing protocol found in the data packet, the parsing and decision logic 20 is able to decide the nature of the addressing lookup operations for the lookup processor 22.

The parsing and decision logic 20, upon identifying the addressing information at the respective addressing protocol layers as shown in FIGS. 4A–4F, forwards the addressing information to the lookup processor 22. Specifically, the parsing and decision logic 20 outputs an addressing protocol identifier that identifies at least whether the layer-2 or layer-3 processing is to be performed. Preferably, the addressing protocol identifier specifies the actual addressing protocol to be used, for example Ethernet or IEEE 802.3 for layer-2 processing, and or IPv4, IPv6, etc. for layer-3 addressing, if applicable. Hence, the addressing protocol identifier specifies an addressing protocol to be used for the corresponding received data packet, for example one of the addressing protocols of FIGS. 4A–4F, enabling enhanced switching functions for data packets having the appropriate addressing protocol.

The lookup processor 22 uses the parsed addressing information including the addressing protocol identifier to determine which of the output ports 14 will output the received data packet. As described below, the lookup processor 22 concurrently compares the address information received from the parsing and decision logic 20 with destination address information stored in an external memory 24 (e.g., a synchronous SRAM), for a plurality of received data packets at the same time. For example, the lookup processor 22 identifies a destination output port by accessing the SSRAM 24 based on at least one of the source address and destination address supplied by the parsing and decision logic 20 for a given addressing protocol. According to the disclosed embodiment, the lookup processor 22 uses the network-based addressing protocol, if available, to determine the network output port. Alternatively, the lookup processor 22 performs the lookup processing using the appropriate MAC-based addressing protocol if no higher layer protocol is available. Hence, the lookup processor 22 uses layer-3 addressing protocol, if available, and layer-2 processing if the data packet does not have layer-3 addressing.

The external memory 24 stores port vectors identifying a selected group of the output ports 14 for addresses parsed by the decision logic 20. For example, a given MAC destination address may identify a single output port 14a, or may identify all the output ports 14a, 14b, 14c, and 14d if the MAC destination address corresponds to a broadcast address. Hence, the lookup processor 22 performs a lookup operation by accessing the SSRAM 24 based on the address information supplied by the parsing and decision logic 20 to identify a port vector that specifies the destination output ports for the corresponding data packet. It will be recognized in the art that various addressing schemes can be used, for example accessing the SSRAM 24 using the destination address only, or accessing the SSRAM 24 using a direct accessing scheme based on the destination address at the MAC layer or the IP layer, or index-based addressing, where hash functions are used to generate an index of the destination address for accessing the SSRAM 24.

Regardless of the addressing scheme used by the lookup processor 22, a primary consideration is that the lookup processor 22 be capable of performing a lookup decision relatively quickly for high speed networks, on the order of within 300 nanoseconds. However, memory access tends to be a relatively slow operation in execution of logical operations, since access of a memory requires one clock cycle for addressing the memory, and another clock cycle for reading the data from the address memory location. Depending on the memory architecture, the number of clock cycles for memory access may be even longer. Hence, there is a need for overcoming the "memory bottleneck" of at least two clock cycles per memory access to enable high speed processing for a network switch in a high speed data network.

In addition, layer-3 based addressing for network switches is still under development. Hence, there is a need for a programmable instruction base for use in a network switch that can be changed as layer-3 switching algorithms are developed.

According to the disclosed embodiment, the lookup processor 22 provides an architecture that overcomes the two-cycle memory access limitation, effectively reducing the overall access time for accessing the SSRAM 24 from two cycles to one cycle. According to the disclosed embodiment, a pipelining and timesharing approach is used, where multiple lookup operations are concurrently executed in the lookup processor 22 by successively executing the lookup operation within a prescribed number of clock cycles. In particular, the lookup processor 22 concurrently executes such instructions, for example memory read instructions, by successively executing each such instruction within a prescribed number of clock cycles.

Figure 2:
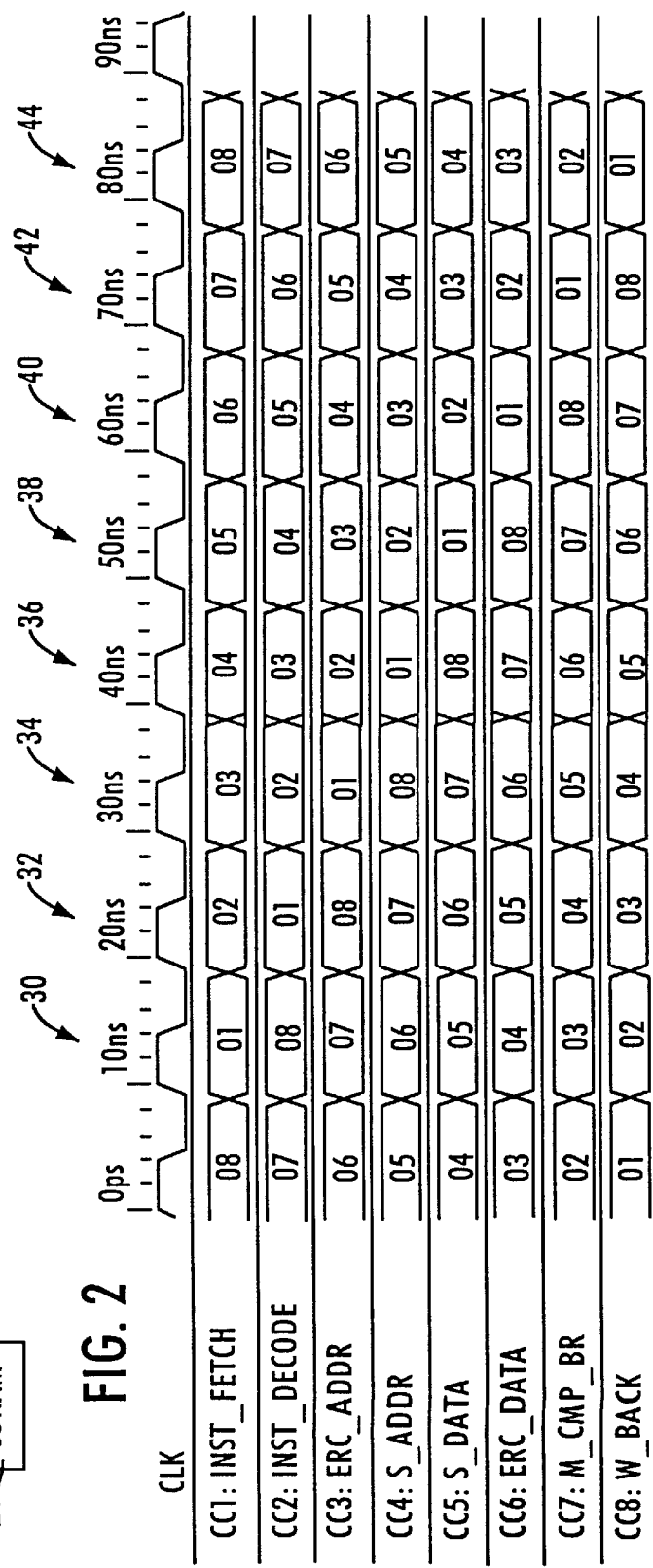
FIG. 2 is a timing diagram illustrating the method of concurrently executing a plurality of instructions in the lookup processor of FIG. 1 according to an embodiment of the present invention.

FIG. 2 is a timing diagram illustrating the arrangement for concurrently determining output switch ports for a prescribed number of data packets by concurrently executing instruction operations during each clock cycle. As shown in FIG. 2, the lookup processor 22 concurrently executes eight instruction operations each 10 nanosecond clock cycle for each fetched instruction. Specifically, FIG. 2 illustrates eight instructions (01,02,03,... ,08) that are successively fetched during an instruction fetch operation (INST_FETCH) for a prescribed number of execution clock cycles. In particular, each instruction executed by the lookup processor 22 has a corresponding number of instruction operations up to a prescribed number of clock cycles, in this case eight clock cycles. Since each executable instruction has up to eight instruction operations requiring a total of eight clock cycles, the lookup processor 22 is configured for concurrently processing up to eight instructions each clock cycle. Hence, eight concurrent lookup operations are performed by the lookup processor 22 to the SSRAM 24, where each lookup operation for the corresponding instruction is executed in a staggered arrangement relative to the other instructions.

Figure 3B:
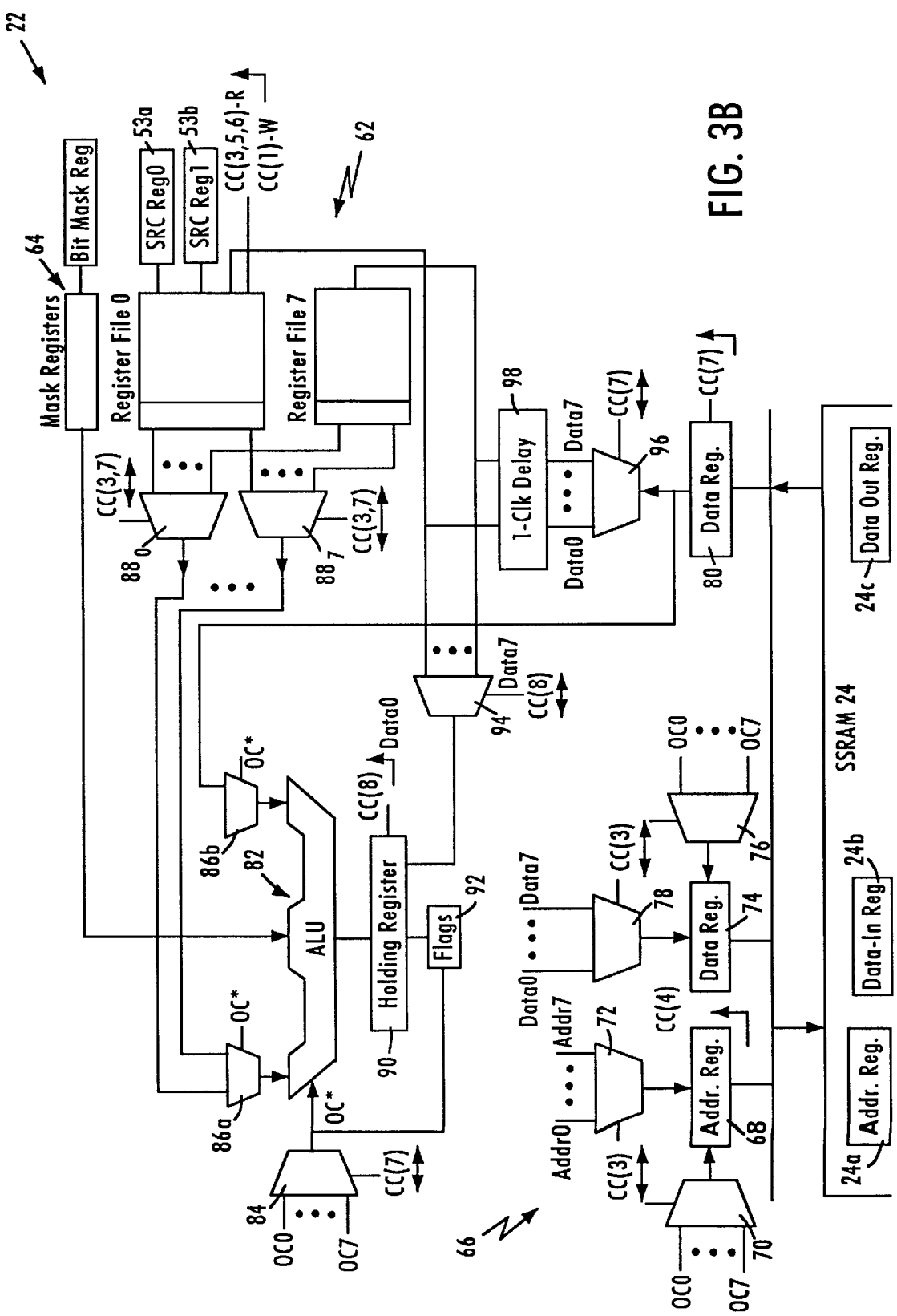

FIG. 3 is a block diagram illustrating the lookup processor 22 according to an embodiment of the present invention. The lookup processor 22 includes a 3-bit counter 50 for counting a count value each clock cycle of a repeating sequence of a prescribed number of clock cycles. The counter 50 is preferably a modulo-8 counter that counts a repeating sequence of eight clock cycles corresponding to the maximum number of execution operations for any instruction. The 3-bit counter 50 outputs a count value that specifies a time slot of the clock cycle, used to enable the logic components of the lookup processor 22 to selectively execute the corresponding instruction operation for selected addresses, described below.

The lookup processor 22 also includes an instruction memory 52 having a memory portion 52a for storing a sequence of executable instructions for lookup processing for each of the data packet types shown in FIGS. 4A–4F. Specifically, the instruction memory 52a is programmable to enable storage of instructions for performing selected lookup operations according to the addressing protocol identifier, described above, output by the parsing and decision logic 20. Hence, the instruction memory 52 has instruction sequences for lookup operations for Ethernet or IEEE 802.3 processing (layer-2) plus Ipv4 or Ipv6 (layer-3) processing. The instruction memory also includes a multiplexer 52b for selectively outputting an instruction address for fetching a selected address from the instruction memory 52a. The multiplexer 52b selectively outputs one of a plurality of addresses specifying a different instruction to be executed by the lookup processor 22.

The lookup processor 22 also includes an instruction control unit 54 for concurrently supplying the instruction addresses to the multiplexer 52b for execution of the above-described execution sequences for respective data packets according to layer-2 or layer-3 processing. FIG. 6 is a diagram illustrating in detail the instruction control unit 54. The instruction control unit 54 includes a plurality of program counter circuits 56 for outputting the instruction address for a corresponding instruction sequence of a lookup operation to be performed. Each program counter circuit 56 supplies an instruction address to the multiplexer 52b (e.g., IA0, IA1, ... , IA7) and includes a start register 56a for storing a start address for the instruction sequence, a branch register 56b for storing a branch address specified by an instruction (e.g., a jump instruction or conditional branch instruction), and a program counter register 56c for storing a current address to be executed. Each program counter circuit 56 also includes a multiplexer 56d for selectively outputting the start address stored in the register 56a, the branch address stored in the register 56b, or the program counter address stored in the register 56c based on program instruction control signals. As shown in FIG. 6, the instruction control unit 54 also includes an instruction controller 58 for generating the program instruction control signals for each of the program counter circuits 56 based on a corresponding instruction sequence (i.e., a code sequence) for performing a prescribed operation, for example a lookup for a MAC-layer protocol or a network-layer protocol. The instruction controller 58 generates the program instruction control signals for the multiplexer 56d, and loads the appropriate address values into the registers 56a, 56b, and 56c, respectively. The instruction controller 58 controls the fetching of a sequence of instructions by loading the start address for the first instruction into the start address 56a, and controlling the multiplexer 56d to output the start address from the register 56a. The start address also is loaded from the register 56a into the program counter 56c, enabling the program count value to be incremented for the next instruction in the instruction sequence. If a branch operation is to be performed, the instruction controller 58 controls the corresponding multiplexer 56d to output the value from the branch register 56b, and loads the branch value into the program counter register 56c.

The instruction controller 58 generates the program instruction control signals for each of the program counter circuits 56 (IA0 . . .IA7) for execution of a corresponding lookup operation based on an identified addressing protocol for a corresponding received data packet. The instruction controller 58 receives the identified addressing protocol for the corresponding data packet from a corresponding register file 62, described below.

As shown in FIG. 3, the lookup processor 22 further includes an instruction decoder 60 for decoding, each clock cycle, the instruction fetched from the instruction memory 52*a* during a preceding clock cycle. For example, assuming in FIG. 2 that the instruction control unit 54 supplies an instruction address for instruction 01 during clock cycle 30 in FIG. 2, the instruction memory 52*a* performs the instruction operation INST_FETCH of fetching and outputting instruction 01 from the addressed memory location during the first relative clock cycle (CC1) occurring at real clock cycle 30. A "relative clock cycle" refers to a relative position of an instruction operation during execution of a corresponding instruction. The instruction decoder 60 decodes instruction 01 as instruction operation INST_DECODE during the relative clock cycle CC2 at real clock cycle 32.

Hence, the instruction decoder 60 decodes a fetched address output from the instruction memory 52*a* each clock cycle. For example, FIG. 2 illustrates that the decoding operation (INST_DECODE) decodes the first instruction during clock cycle 32, the second instruction (02) during clock cycle 34, the third instruction (03) during clock cycle 36, etc. Hence, the instruction decoder 60 successively decodes each clock cycle a fetched instruction output from the instruction memory 52.

The lookup processor 22 also includes a plurality of register files 62 for storing the parsed data supplied from the parsing and decision logic 20. Each register file stores the parsed data for a corresponding received data packet during the lookup processing performed by the lookup processor 22. Hence, the lookup processor 22 has the capacity to simultaneously store the parsed data for eight received data packets in the respective register files 0–7.

Figure 5A:
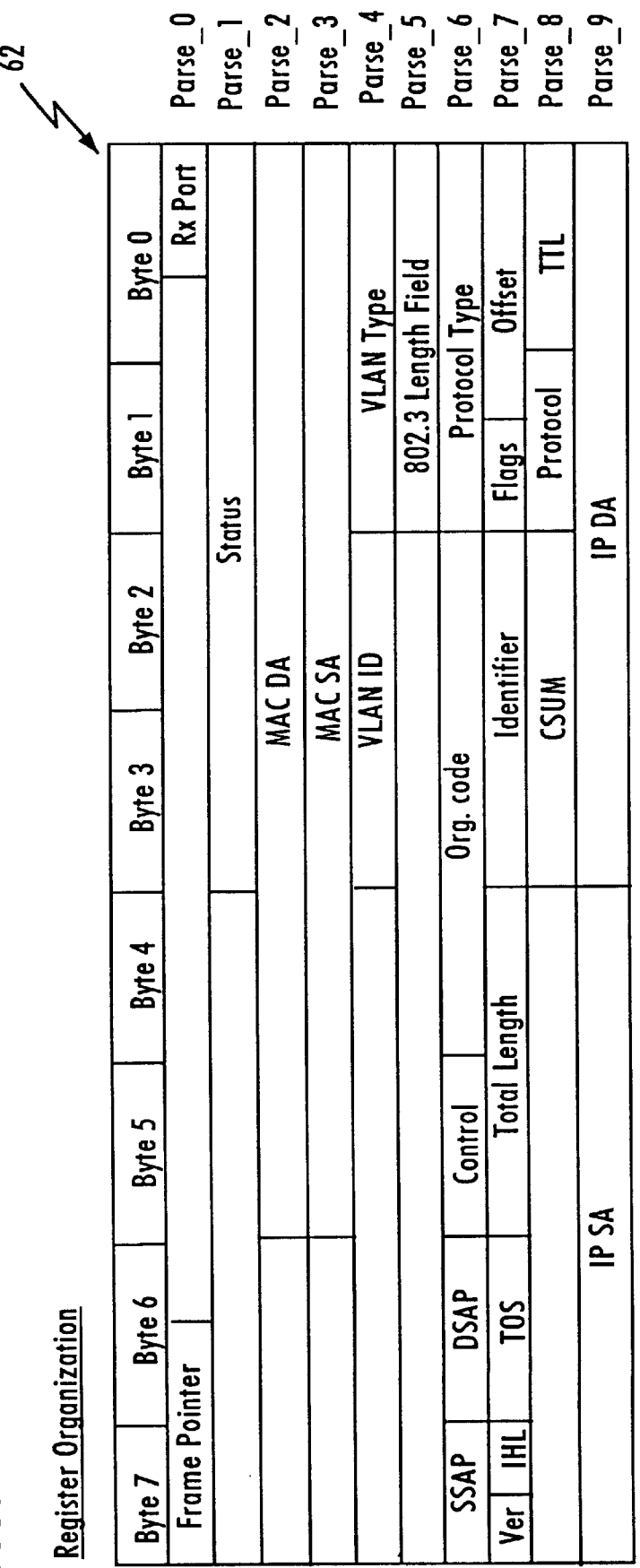

FIGS. 5A and 5B are diagrams illustrating the organization of each register file 62 for received data packets parsed by the parsing and decision logic 20. In particular, FIG. 5A illustrates the register file organization for a received data packet having IEEE 802.3 layer-2 protocol and IPv4 layer 3 protocol, and FIG. 5B illustrates the register file organization for a received data packet having IEEE 802.3 layer-2 protocol and Ipv6 layer-3 protocol. As described above, the layer-2 and layer-3 protocol identifiers are supplied to the instruction control unit 54 to enable execution of the appropriate instruction sequence for the corresponding layer-2 and layer-3 protocols. As described below, an instruction executed by the lookup processor 22 accesses data from the register file by addressing a corresponding source register 53, shown in FIG. 3.

FIG. 7 is a diagram illustrating in detail an instruction 100 decoded by the instruction decoder 60. As shown in FIG. 7, the instruction includes an op code control (OC) that specifies the logical operation to be performed, for example load, read, or add. The destination field (DEST) specifies an address location in a selected register file 62 for storing the result of the logical operation specified by the op code field. Source register (SRC Reg.) 1 and source register 2 store address locations of respective operands in the corresponding register file 62, respectively. The bit mask register specifies an address for a stored mask in a mask register 64 (see FIG. 3), if applicable. The memory register (Mem Reg.) stores an address location for direct addressing of the SRAM 24, if applicable. The branch address stores a branch address to be used by the instruction controller 58, for example if the logical operation provides a prescribed result.

The lookup processor 22 further includes a memory interface 66 for selectively supplying memory addresses, decoded each clock cycle by the instruction decoder 60, to the external memory 24. The memory interface 66 includes an address register 68, a first multiplexer 70 for controlling the address register 68 based on the corresponding op code control (OC) selected during the corresponding clock sequence, an address multiplexer 72 for selectively supplying a memory address location to the address register 68 in response to the appropriate clock cycle. The memory interface 66 also includes a data register 74 for storing data to be written to the SSRAM 24, an op code multiplexer 76 for selectively controlling the data register 74 according to the appropriate clock cycle, and a data multiplexer 78 for selectively supplying data to the data register 74 in accordance with the appropriate relative clock cycle. As shown in FIG. 2, address data from the decoded instruction is loaded into the address register 68 as instruction operation ERC_ADDR during the relative clock cycle CC3. The memory address stored in the address register 68 is then supplied to an SRAM address register 24*a* as instruction operation S_ADDR during the relative clock cycle CC4. The synchronous SRAM 24 then fetches the address data during relative clock cycle CC5 as the instruction operation S_DATA, and stores the fetched data in its internal output register 24*c*.

As shown in FIG. 3, the lookup processor 22 includes a memory data register 80 for latching the data supplied by the SRAM 24 from the data output register 24*c* as the instruction operation ERC_DATA during the relative clock cycle CC6.

The lookup processor 22 also includes an arithmetic logic unit (ALU) 82 that selectively performs arithmetic operations based on op code control signals supplied by multiplexer 84 and the logical operands selectively supplied from the register files 62 by multiplexers 86 and 88. The ALU 82 performs the logical operation specified by the op code control (OC*) output by the multiplexer 84, and stores the logical result in a holding register 90. The logical result stored in the holding register 90 is used to selectively set the flags in a flag register 92. The logical value in the holding register 90 (e.g., summation result from the operation ADD:C←A+B) is output to the demultiplexer 94 for storage in the corresponding register file 62 as a write back instruction operation (W_BACK) during relative clock cycle CC8.

As shown in FIG. 3, the multiplexers 88 selectively supply operands to the arithmetic logic unit 82 during any of the relative clock cycles CC3, CC4, CC5, CC6, or CC7, depending on the logical operation being performed. According to the disclosed embodiment, comparisons between data stored in a selected one of the register files 62 (e.g., layer-2 or layer-3 addressing data) are compared with data fetched from the SSRAM 24 following the external rules checker data retrieval instruction operation during relative clock cycle CC6, during which point data stored in the data register 80 is supplied to the multiplexer 86*b*. The registers 86*a* and 86*b* selectively supply the data from the corresponding register file and the data register 80, respectively, in response to the operational control signal supplied by the multiplexer 84 during relative clock cycle CC7. The ALU 82 performs the logical instruction operation M_CMP_BR during relative clock cycle CC7, and outputs the logical result to the holding register 90. The holding register 90 outputs the result to the demultiplexer 94, enabling the result to be written back to the appropriate register file 62 during clock cycle 8. Each of the multiplexers 52b, 70, 72, 76, 78, 88, 94, 96 are controlled by the counter 50 to enable execution of the corresponding instruction operation based on the count value output by the counter 50 and the corresponding position ($CC_i$) in the execution sequence.

Hence, the lookup processor 22 is configured for concurrently executing fetched instructions by successively executing each of the fetched instructions within a prescribed number of clock cycles. For example, the lookup processor 22 executes the instruction operation INST_FETCH for instruction 01 during clock cycle 30. The subsequent instruction operations at the relative clock cycles (CC2, CC3, CC4, CC5, CC6, CC7, and CC8) for instruction 1 are performed during clock cycles 32, 34, 36, 38, 40, 42, and 44, respectively. Conversely, each logic component of the lookup processor 22 (e.g., decoder 60) performs the corresponding instruction operation for the selected instruction during each clock cycle. Hence, the instruction decoder 60 performs the decoding operation for instructions 01, 02, 03, 04 as instruction operation INST_DECODE for relative clock cycle CC2 during clock cycles 32, 34, 36, and 38, respectively. Hence, each logic component of the lookup processor 22 successively executes the corresponding instruction operation, during each clock cycle, for the corresponding instruction. Consequently, the lookup processor 22 provides the performance of concurrently executing 8 lookup operations, without the necessity of additional redundant logic circuitry as normally found in parallel processing architectures. Hence, the disclosed lookup processor 22 provides the performance of concurrently executing multiple instructions, without the expense normally associated with parallel-processing architectures.

According to the disclosed embodiment, instructions are concurrently executed in a processor within a prescribed number of clock cycles without the necessity of redundant logical components. Since each of the instruction operations are executed independently of each other, the disclosed embodiment enables any type of processor-based instruction operation to be performed in an efficient manner. Hence, the disclosed arrangement is particularly advantageous for systems that require high throughput, yet require a flexible instruction base for applications such as layer-3 addressing operations, that make hardware implementation (e.g., reduction to silicon) an impractical solution. Hence, the disclosed embodiment provides an efficient, flexible and low cost processing architecture for demanding applications such as high speed network switching.

Although the disclosed processor architecture has been described with respect to lookup operations for network addressing, it will be appreciated that the disclosed embodiment is applicable to other processing applications that require effectively simultaneous execution of multiple instructions.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a processor circuit, having a plurality of logic components for concurrently executing a plurality of different instruction operations of a plurality of instructions, each instruction requiring a number of instruction operations to fully execute said each instruction, the method comprising:

outputting a count value each clock cycle, the count value identifying one of a prescribed number of clock cycles, the number of instruction operations to fully execute said each instruction being equal to or less than the prescribed number of clock cycles; and each logic component selecting, based on the count value, one of a plurality of operands associated with a corresponding instruction for execution of a corresponding instruction operation each clock cycle, wherein said logic components concurrently execute a plurality of different instruction operations during each clock cycle with each of the plurality of different instruction operations being for a different instruction.

2. The method of claim 1, wherein each logic component comprises a multiplexer and instruction operation circuitry for performing the corresponding instruction operation, the selecting by each logic component comprising:

receiving by the corresponding multiplexer the operands for execution of the corresponding instruction operation for the respective instructions; and selectively outputting the selected one operand from the multiplexer to the corresponding instruction operation circuitry based on the count value.

3. A processor apparatus, comprising:

an instruction control unit for supplying a plurality of instruction addresses;

a counter for outputting a count value, each clock cycle, of a repeating sequence of a prescribed number of clock cycles;

an instruction memory storing a plurality of instructions and receiving, during each clock cycle, one instruction address from the instruction control unit based on the count value output by the counter, the instruction memory selectively fetching and outputting, each clock cycle, the instruction corresponding to the instruction address received during each clock cycle an instruction decoder for decoding, each clock cycle, the fetched instruction output from the instruction memory the preceding clock cycle, the instruction decoder configured for identifying a memory address and an instruction operation for each fetched instruction;

a memory interface for selectively supplying to an external memory, each clock cycle, one of a plurality of the memory addresses supplied during each clock cycle and identified by the instruction decoder for the respective fetched instruction, the memory interface selecting the corresponding supplied memory address based on the count value; and a logic unit configured for selectively executing, each clock cycle, one of a plurality of instruction operations for the corresponding fetched instruction using memory data retrieved from the supplied memory address, the plurality of instruction operations being necessary to fully execute the corresponding fetched instruction and the logic unit selecting said one the plurality of instruction operations based on the count value.

4. The processor apparatus of claim 3, wherein the instruction control unit concurrently supplies a plurality of instructions and comprises:

a plurality of program counter circuits for outputting the plurality of instruction addresses, respectively, each program counter circuit including a start register for storing a start address, a branch register for storing a branch address, a program counter register for incrementing the corresponding instruction address, and a multiplexer for selectively outputting one of the start address, the branch address, and the incremented instruction address as the instruction address in response to program instruction control signals; and an instruction controller for generating the program instruction control signals for each of the program counter circuits in response to a corresponding instruction sequence.

5. The processor apparatus of claim 3, wherein the instruction memory comprises a first multiplexer receiving the plurality of instructions for the prescribed number of clock cycles, the first multiplexer outputting the one selected instruction address in response to the count value.

6. The processor apparatus of claim 5, wherein the memory interface comprises a second multiplexer receiving the supplied memory addresses, the second multiplexer outputting the one supplied memory address in response to the count value and based on a corresponding position of the memory interface in a prescribed execution order.

7. A method of executing a plurality of instructions requiring access to a memory, each instruction to be fully executed within a prescribed number of clock cycles and requiring a plurality of instruction operations for execution with each instruction operation performed in one clock cycle, the method comprising:

in a first clock cycle, fetching a first instruction;

in a second clock cycle, initiating decoding of the first instruction while concurrently fetching a second instruction;

in a third clock cycle, supplying a memory address for the first instruction to the memory while initiating decoding of the second instruction and fetching a third instruction;

in a fourth clock cycle, causing the memory to latch the supplied memory address for the first instruction while supplying a memory address for the second instruction to the memory, initiating decoding of the third instruction and fetching a fourth instruction;

in a fifth clock cycle, causing the memory to access memory data in response to the supplied memory address for the first instruction while causing the memory to latch the supplied memory address for the second instruction, supplying a memory address for the third instruction to the memory, initiating decoding of the fourth instruction and fetching a fifth instruction;

in a sixth clock cycle, loading the accessed memory data for the first instruction into a data register while causing the memory to access memory data in response to the supplied memory address for the second instruction, causing the memory to latch the supplied memory address for the third instruction, supplying a memory address for the fourth instruction to the memory, initiating decoding of the fifth instruction and fetching a sixth instruction;

in a seventh clock cycle, comparing the accessed memory data for the first instruction with data in a register file corresponding to the accessed memory data for the first instruction while loading the accessed memory data for the second instruction into the data register, causing the memory to access memory data in response to the supplied memory address for the third instruction, causing the memory to latch the supplied memory address for the fourth instruction, supplying a memory address for the fifth instruction to the memory, initiating decoding of the sixth instruction and fetching a seventh instruction;

in an eighth clock cycle, in response to the step of comparing carried out in the immediately preceding clock cycle, writing the accessed memory data for the first instruction into the register file corresponding to the accessed memory data for the first instruction while comparing the accessed memory data for the second instruction with data in a register file corresponding to the accessed memory data for the second instruction, loading the accessed memory data for the third instruction into the data register, causing the memory to access memory data in response to the supplied memory address for the fourth instruction, causing the memory to latch the supplied memory address for the fifth instruction, supplying a memory address for the sixth instruction to the memory, initiating decoding of the seventh instruction and fetching a eighth instruction; and continuing to perform the steps of the eighth clock cycle on successive instructions until all instructions have been fetched and the writing the accessed memory data for the last instruction to be fetched into the register file corresponding to the accessed memory data for the last instruction to be fetched, in response to the step of comparing carried out in the immediately preceding clock cycle, has been carried out.

* * * * *